United States Patent
Xu et al.

(10) Patent No.: US 9,389,912 B2
(45) Date of Patent: Jul. 12, 2016

(54) MULTI-RESOURCE TASK SCHEDULING METHOD

(71) Applicant: Tsinghua University, Beijing (CN)

(72) Inventors: Ke Xu, Beijing (CN); Yuchao Zhang, Beijing (CN); Dongchao Ma, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/708,170

(22) Filed: May 8, 2015

(65) Prior Publication Data

US 2015/0324230 A1 Nov. 12, 2015

(30) Foreign Application Priority Data

May 9, 2014 (CN) .......................... 2014 1 0196890

(51) Int. Cl.
*G06F 9/46* (2006.01)
*G06F 9/48* (2006.01)

(52) U.S. Cl.
CPC .................................. *G06F 9/4887* (2013.01)

(58) Field of Classification Search
None
See application file for complete search history.

(56) References Cited

U.S. PATENT DOCUMENTS

2013/0166750 A1* 6/2013 Moon .................. H04L 67/322
709/226

* cited by examiner

*Primary Examiner* — Sisley Kim
(74) *Attorney, Agent, or Firm* — Kile Park Reed & Houtteman LLC

(57) ABSTRACT

A multi-resource task scheduling method includes: classifying concurrency packets to distinguish packets with deadline and packets without deadline; ranking packets with deadline using EDF algorithm and ranking packets without deadline using SJF algorithm; estimating a virtual start time and a virtual completion time according to ranking results; determining whether packets with deadline can be scheduled successfully; if yes, determining whether there is a packet without deadline, which can be arranged to be scheduled before the packets with deadline and can shorten average completion time, existing in the packets without deadline; and if yes, scheduling the packet without deadline, which can be arranged to be scheduled before the packets with deadline, in advance. The method can shorten the average completion time of all tasks greatly under multi-resource circumstance.

8 Claims, 3 Drawing Sheets

CPU bandwidth

CPU bandwidth

MULTI-RESOURCE TASK SCHEDULING METHOD

CROSS-REFERENCE TO RELATED APPLICATION

This application claims priority to and benefits of Chinese Patent Application Serial No. 201410196890.8, filed with the State Intellectual Property Office of P. R. China on May 9, 2014, the entire contents of which are incorporated herein by reference.

FIELD

The present disclosure relates to computer network technology field, more particularly, to a multi-resource task scheduling method.

BACKGROUND

A variety of new conceptual methods ramified for the computer network require various hardware resources. Different tasks consume different numbers of resources, such as CPU, link bandwidth, disk, etc. Although packet-level bandwidth allocation in the router has been studied extensively, users require different resources on task-level, making it more difficult for multi-resource scheduling. For example, intrusion detection is usually limited by CPU, bottleneck of software router exists in the memory, and the limited resource of forwarding big packet is the link bandwidth. Therefore, an intermediate box needs to be able to make right decisions for scheduling various resources.

Some existing classical single resource scheduling algorithms are EDF (Early Deadline First) algorithm and SJF (Short Job First) algorithm, etc. The EDF algorithm determines priority of the task according to the start time and deadline of the task. The earlier the deadline is, the higher the priority is. Core of the SJF algorithm is that each of all tasks has a priority. The priority of a short task is higher than that of a long task. The operation system always arranges the task with high priority to run first. Besides, there are FCFS (first come first serve) algorithm and time-slice polling algorithm, etc.

Currently, a multi-resource scheduling algorithm is presented. Based on the fairness on dominant resource, a dominant resource, i.e., a resource which is used mostly, is chosen from each task. Therefore, their dominant resources of different tasks can be fairly distributed. However, although this method can ensure fairness, for the whole system, average completion time of the task flow is too long. It means that the user has to wait for a long time, resulting in poor user experience.

SUMMARY

In our implementation, a multi-resource task scheduling method is provided. The method can shorten average completion time of all tasks greatly under multi-resource circumstance.

The method includes the following steps: classifying a number of concurrency packets to distinguish packets with deadline and packets without deadline; ranking packets with deadline using EDF algorithm and ranking the packets without deadline using SJF algorithm; estimating a virtual start time and a virtual completion time of the packets according to ranking results; determining whether the packets with deadline can be scheduled successfully according to the virtual start time and the virtual completion time; if yes, determining whether there is a packet without deadline, which can be arranged to be scheduled before the packets with deadline and can shorten average completion time, existing in the packets without deadline, according to the virtual start time and the virtual completion time; and if yes, scheduling the packet without deadline, which can be arranged to be scheduled before the packets with deadline and can shorten the average completion time, in advance to shorten the average scheduling time of the packets.

The concurrency packets are classified to packets with deadline and packets without deadline according to the multi-resource task scheduling method of embodiments of the present disclosure. The packets with deadline are ranked using the EDF algorithm to reduce packet loss rate. The packets without deadline are ranked using the SJF algorithm to shorten the average completion time. Whether the scheduling is successful is determined by defining the system virtual time and calculating the estimated start time and completion time. The packets, which are not scheduled successfully, are discarded and the packets, which are scheduled successfully, are re-ranked to shorten the average completion time. Therefore, in the case of each packet requiring different resources, the method can shorten the average completion time of all tasks greatly by incorporating the EDF and SJF algorithms under the premise of minimizing packet loss rate. Therefore, better service can be provided for various network operations.

In some embodiments of the present disclosure, determining whether the packets with deadline can be scheduled successfully according to the virtual start time and the virtual completion time of the packets further includes: discarding the packets with deadline if the packets with deadline cannot be scheduled successfully.

In some embodiments of the present disclosure, estimating the virtual start time and the virtual completion time of the packets according to the ranking results is implemented by the following equations:

$$S(p_i)=F(p_{i-1}),$$

$$F(p_i)=S(p_i)+s_i^j,$$

where $S(p_i)$ is the virtual start time of a packet Pi, $F(p_i)$ is the virtual completion time of the packet Pi, $s_i^j$ is a virtual processing time of the packet Pi spending on a resource j, and i indicates the i-th packet.

In some embodiments of the present disclosure, discarding the packets with deadline if the packets with deadline cannot be scheduled successfully, includes: determining whether there is a packet with a deadline smaller than $F(p_i)$ existing in the packets with deadline; if yes, determining that the packet cannot be scheduled successfully and discarding the packet.

In some embodiments of the present disclosure, scheduling the packet without deadline, which can be arranged to be scheduled before the packets with deadline and can shorten the average completion time, in advance, further includes: setting number of the packet with deadline as m, and number of the packet without deadline as n; determining whether both of m and n satisfy the following formulas under any resource j:

$$S(p_y)-S(p_x)-(s_y^j)\times(y-x)>0,$$

$$\exists x\in(1,m), y\in(m+1,m+n), \forall j$$

where, $p_x$ indicates the x-th packet with deadline, $p_y$ indicates the y-th packet, i.e., the (y−m)-th packet without deadline, $S(p_y)-S(p_x)$ indicates a time saved by scheduling $p_y$ before $p_x$, $(s_y^j)$ indicates a processing time of $p_y$ spending on the resource j, (y−x) indicates that number of packet that is influenced by scheduling $p_y$ in advance, and $(s_y^j) \times (y-x)$ indicates a total delay which is caused by scheduling $p_y$ before $p_x$ to other packets; and if yes, scheduling the packet without deadline in advance before the packet with deadline.

In some embodiments of the present disclosure, the method further includes: determining whether a newly-arriving packet has a deadline; if yes, determining whether the newly-arriving packet influences other packets with deadline; discarding the newly-arriving packet if the newly-arriving packet influences other packets with deadline.

In some embodiments of the present disclosure, the method further includes: arranging the newly-arriving packet in the queue tail according to the order of first-come-first-serve if the newly-arriving packet has no deadline.

In some embodiments of the present disclosure, the method further includes: determining whether all tasks of the newly-arriving packet in a pre-set time period satisfy the following formulas simultaneously:

$$D(p_x) - F(p_x) \geq s_{new}^j,$$

$$\forall x \in (D(p_{new}) - s_{new}^j, F(p_m)), \forall j,$$

where, $p_{new}$ indicates the newly-arriving packet, $D(p_{new})$ indicates the deadline of $p_{new}$, $(D(p_{new}) - s_{new}^j, F(p_m))$ indicates the pre-set time period, and $s_{new}^j$ indicates the processing time of the newly-arriving packet spending on the resource j; if all tasks of the newly-arriving packet in the pre-set time period satisfy the formulas simultaneously, inserting the newly-arriving packet before the other packets with deadline to be scheduled in advance.

In some embodiments of the present disclosure, the method further includes: discarding the newly-arriving packet if the newly-arriving packet does not satisfy the formulas simultaneously.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
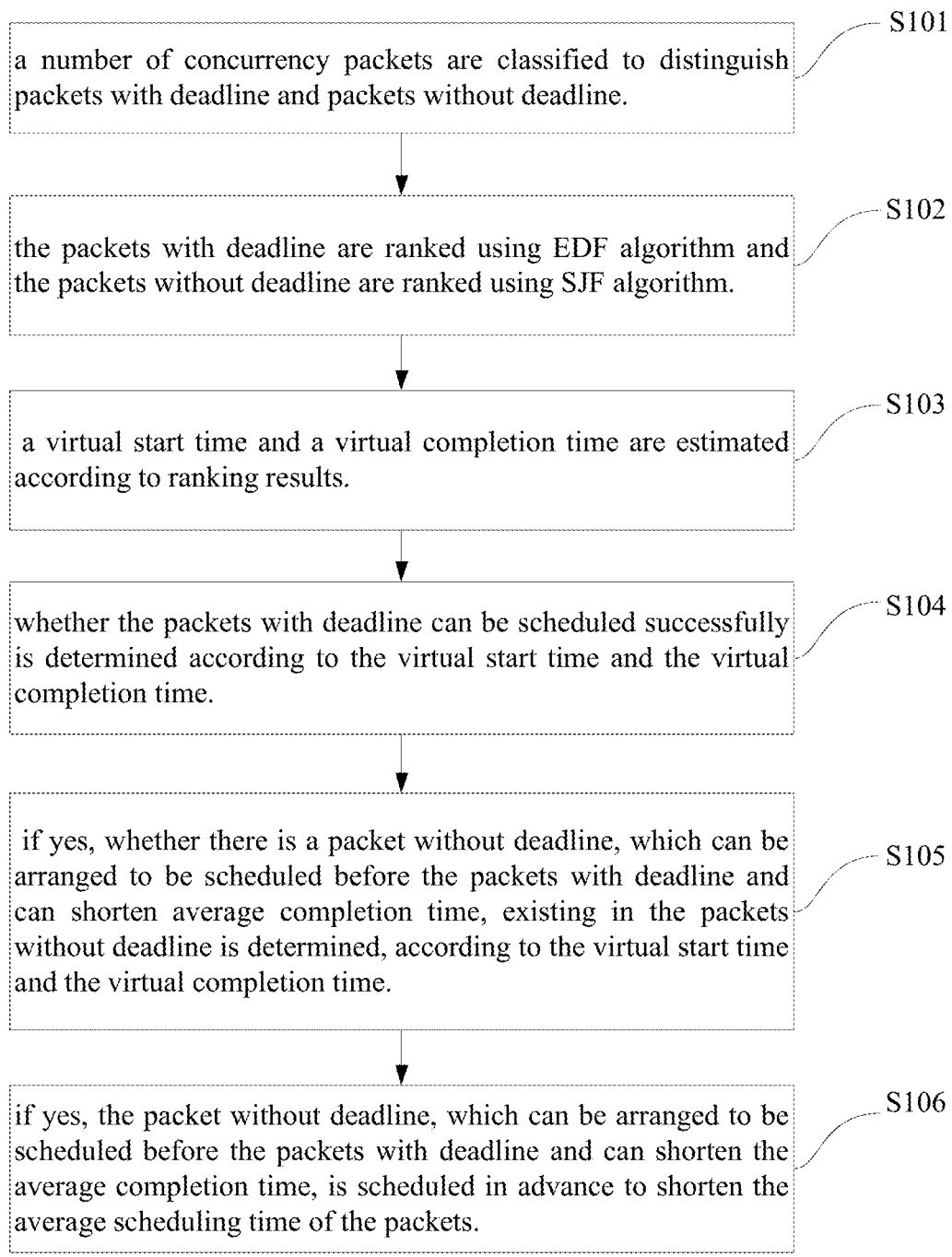
FIG. 1 is a flow chart of a multi-resource task scheduling method, according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Following are descriptions of a multi-resource task scheduling method along with the drawings.

FIG. 1 is a flow chart of a multi-resource task scheduling method, according to an embodiment of the present disclosure. As shown in FIG. 1, the multi-resource task scheduling method includes following steps.

Step S101, a number of concurrency packets are classified to distinguish packets with deadline and packets without deadline. That is to say, the concurrency packets are classified into two types: packets with deadline and packets without deadline, represented as $D(p_x)$ and $U(p_x)$ respectively.

Step S102, the packets with deadline are ranked using EDF algorithm and the packets without deadline are ranked using SJF algorithm. Specifically, because the packet with deadline has strict deadline, therefore, the EDF (Early Deadline First) algorithm is used to rank the packets with deadline, which minimizes the packet loss rate because the packet is not done processing in a preset time period. Besides, because the packet without deadline has no strict deadline, therefore, the SJF (Short Job First) algorithm is used to make the average completion time of the packet shortest. For the multi-resource request, the length of packet is calculated according to sum of requested number of various resources. If sum of number of requested resource is the same, then the number of requested bottleneck resource prevails according to the scheduling order of priority of short packet.

As a specific example, for example, the number of packet reaches 7 in a certain time point, and there are different demands for CPU and bandwidth. Detailed information is shown in Table 1.

TABLE 1

| Packet | P1 | P2 | P3 | P4 | P5 | P6 | P7 |
|---|---|---|---|---|---|---|---|
| CPU C(Pi) | 2 | 3 | 1 | 2 | 2 | 1 | 4 |
| Bandwidth B(Pi) | 3 | 1 | 2 | 3 | 3 | 1 | 2 |
| Deadline $D(p_i)$ | 7 | 4 | 8 | 11 | null | null | null |

As shown in Table 1, first, P1 to P4 belong to the packets with deadline, and P5 to P7 belong to the packets without deadline. The ranking result for P1 to P4 according to EDF is: P2-P1-P3-P4. The ranking result for P5 to P7 according to SJF is: P6-P5-P7.

Step 103, a virtual start time and a virtual completion time of the packets are estimated according to ranking results. That is to say, the virtual start time and the virtual completion time of the packets are estimated according to the ranking results in the step S102.

As a specific embodiment, first, the system virtual time is initialized to zero and a virtual unit of time is defined. The virtual unit of time indicates that when weight of the packet is equal to 1, its processing time is 1 microsecond. More specific, the processing time of the packet is a reciprocal of total capacity of CPU. Therefore, the virtual unit of time is not influenced by resource type and does not depend on the backlog extent of packets. Furthermore, the virtual start time and the virtual completion time of the packets are estimated according to the following equations:

$$S(p_i) = F(p_{i-1}),$$

$$F(p_i) = S(p_i) + s_i^j,$$

where $S(p_i)$ is the virtual start time of packet Pi, $F(p_i)$ is the virtual completion time of packet Pi, $s_i^j$ is a virtual processing time of packet Pi spending on resource j, and i indicates the i-th packet.

Figure 3:
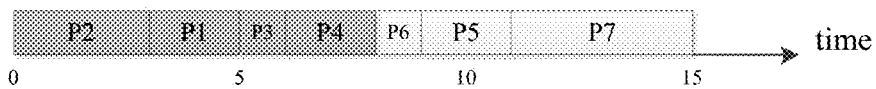
FIG. 3 is a schematic view of a preset scheduling order according to an embodiment of the present disclosure.
Figure 3:
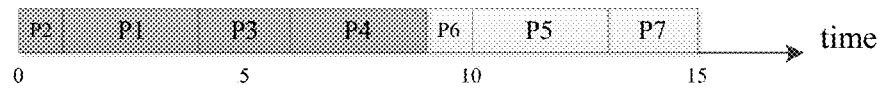

As a specific example, referring to FIG. 3, after the system virtual time is initialized to zero, the virtual completion time $F(p_i)$ of each packet is calculated according to a preset scheduling order (as shown in FIG. 3), as shown in Table 2 specifically.

TABLE 2

| Packet | P2 | P1 | P3 | P4 | P6 | P5 | P7 |
|---|---|---|---|---|---|---|---|
| Completion time of CPU | 3 | 5 | 6 | 8 | 9 | 11 | 15 |
| Completion time of bandwidth | 1 | 4 | 6 | 9 | 10 | 13 | 15 |
| $F(p_i)$ | 3 | 5 | 6 | 9 | 10 | 13 | 15 |
| $D(p_i)$ | 4 | 7 | 8 | 11 | null | null | null |

As shown in Table 2, at this time, the average completion time of the 7 packets is $$\frac{3+5+6+9+10+13+15}{7} = \frac{61}{7} = 8.714.$$

Step S104, whether the packets with deadline can be scheduled successfully is determined according to the virtual start time and the virtual completion time of the packets. Furthermore, if the packet with deadline cannot be scheduled successfully, then the packet with deadline is discarded. The specific steps includes: determining whether there is a packet with a deadline smaller than $F(p_i)$ existing in the packets with deadline; and if yes, determining that the packet cannot be scheduled successfully and discarding the packet.

In other word, first, whether the packet with deadline is scheduled successfully is checked, i.e., the deadline thereof is compared with $F(p_i)$. If there is a packet of $D(p_i)<F(p_i)$, then the scheduling of the packet is proved to be unsuccessful and the packet cannot be done processing before deadline. The packet is discarded and the sending window is halved. The virtual start time and the virtual completion time are estimated again.

As a specific example, as shown in Table 2, at this time, the packets with deadline are checked, and the deadline satisfies $D(p_i)>F(p_i)$. Then they can be scheduled successfully.

Step S105, if yes, whether there is a packet without deadline, which can be arranged to be scheduled before the packets with deadline and can shorten average completion time, existing in the packets without deadline is determined, according to the virtual start time and the virtual completion time of the packets. In other word, in the step S104, if the packets with deadline are determined to be scheduled successfully, then the packets without deadline are checked and whether there is a packet without deadline, which can be scheduled in advance to shorten the whole average completion time, is determined.

Step S106, if yes, the packet without deadline, which can be arranged to be scheduled before the packets with deadline and can shorten the average completion time, is scheduled in advance to shorten the average scheduling time of the packets. In other word, in the step S105, if there is a packet without deadline which can be scheduled in advance to shorten the whole average completion time, then this packet is scheduled in advance before the packet with deadline to shorten the whole average completion time.

As a specific embodiment, the step includes: setting number of the packet with deadline as m (for example, P1 to Pm), and number of the packet without deadline as n (for example, $P_{m+1}$ to $P_{m+n}$); determining whether both of m and n satisfy the following formulas under any resource j:

$$S(p_y)-S(p_x)-(s_y^j)\times(y-x)>0,$$

$$\exists x\in(1,m), y\in(m+1,m+n), \forall j$$

where, $p_x$ indicates the x-th packet with deadline, $p_y$ indicates the (y−m)-th packet without deadline, $S(p_y)-S(p_x)$ indicates a time saved by scheduling $p_y$ before $p_x$, $(s_y^j)$ indicates a processing time of $p_y$ spending on the resource j, (y−x) indicates that number of packet that is influenced by scheduling $p_y$ in advance, and $(s_y^j)\times(y-x)$ indicates a total delay which is caused by scheduling $p_y$ before $p_x$ to other packets; and if yes, scheduling the packet without deadline (for example, $P_y$) in advance before the packet with deadline (for example, $P_x$). Because scheduling $p_y$ in advance shortens the whole completion time by $S(p_y)-S(p_x)$, meanwhile, for the (y−x) packets between $p_y$ and $p_x$, the time delay for each is $s_y^j$. Therefore, the whole shortened time is a difference between $P_y$ and $P_x$ (i.e., $S(p_y)-S(p_x)-(s_y^j)\times(y-x)$). If the difference is bigger than zero, then arranging $p_y$ before $p_x$ optimizes the whole performance of the system, reducing the whole average completion time.

As a specific example, the average completion time after adjusted is shown in Table 3. At this time, the average completion time of the 7 packets is $$\frac{1+4+6+7+10+13+15}{7} = \frac{56}{7} = 8.$$

Following shows Table 3.

TABLE 3

| Packet | P6 | P2 | P1 | P3 | P4 | P5 | P7 |
|---|---|---|---|---|---|---|---|
| Completion time of CPU | 1 | 4 | 6 | 7 | 9 | 11 | 15 |
| Completion time of bandwidth | 1 | 2 | 5 | 7 | 10 | 13 | 15 |
| $F(p_i)$ | 1 | 4 | 6 | 7 | 10 | 13 | 15 |

Furthermore, in one embodiment of the present disclosure, for a newly-arriving packet, a queue jumping checking method is used. First, whether the newly-arriving packet has a deadline is determined. If the newly-arriving packet has a deadline, whether the newly-arriving packet influences other packets with deadline is determined. The newly-arriving packet is discarded if the newly-arriving packet influences other packets with deadline.

On the other hand, if the newly-arriving packet is determined to have no deadline, the newly-arriving packet is arranged in the queue tail according to the order of first-come-first-serve.

As a specific embodiment, the above process includes: if the newly-arriving packet has deadline, determining whether all tasks of the newly-arriving packet in a pre-set time period satisfy the following formulas simultaneously:

$$D(p_x)-F(p_x) \geq s_{new}^j,$$

$$\forall x\in(D(p_{new})-s_{new}^j, F(p_m)), \forall j,$$

where, $p_{new}$ indicates the newly-arriving packet, $D(p_{new})$ indicates the deadline of $p_{new}$, $(D(p_{new})-s_{new}^j, F(p_m))$ indicates the pre-set time period, and $s_{new}^j$ indicates the processing time of the newly-arriving packet spending on the resource j; and if all tasks of the newly-arriving packet in the pre-set time period satisfy the formulas simultaneously, inserting the newly-arriving packet before the other packets with deadline to be scheduled in advance. On the other hand, the newly-arriving packet is discarded if the newly-arriving packet does not satisfy the formulas simultaneously.

Furthermore, the packets without deadline are checked. For the packet P6, x=1 makes:

$$F(p_4)-S(p_1)-(C_{P6})\times(4-1+1)=8-0-1\times4=4>0.\text{ Meanwhile,}$$

$$F(p_4)-S(p_1)-(M_{P6})\times(4-1+1)=9-0-1\times4=5>0.$$

Figure 4:
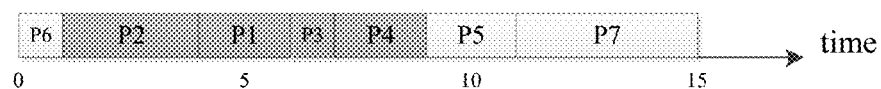
FIG. 4 is a schematic view of an adjusted scheduling order according to an embodiment of the present disclosure.
Figure 4:
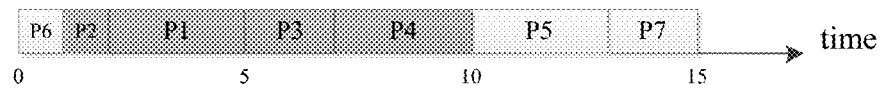

Therefore, P6 can be arranged before P1 to be scheduled in advance. This can shorten the average completion time without affecting the deadline of each packet, as shown in FIG. 4.

As a specific example, as shown in Table, if a packet P8 (1, 1) is newly arriving and its deadline is 5. A packet which is being scheduled at the virtual time 4 is the packet P2, then whether P8 can be inserted in the queue of P2-P1-P3-P4 is checked. That is to say, whether the current task is influenced when time is delayed by time 1 in two types of resource queues. Following shows Table 4.

TABLE 4

| Packet | P6 | P2 | P1 | P3 | P4 | P5 | P7 |
|---|---|---|---|---|---|---|---|
| Completion time of CPU | 1 | 4 + 1 | 6 + 1 | 7 + 1 | 9 + 1 | 11 + 1 | 15 + 1 |
| Completion time of bandwidth | 1 | 2 + 1 | 5 + 1 | 7 + 1 | 10 + 1 | 13 + 1 | 15 + 1 |
| $F(p_i)$ | 1 | 4 + 1 | 6 + 1 | 7 + 1 | 10 + 1 | 13 + 1 | 15 + 1 |
| Deadline | null | 4 | 7 | 8 | 11 | null | null |

As shown in Table 4, obviously, if P8 is inserted, then P2, P1 and P3 cannot be done on time. P8 cannot be scheduled successfully and is discarded.

Figure 2:
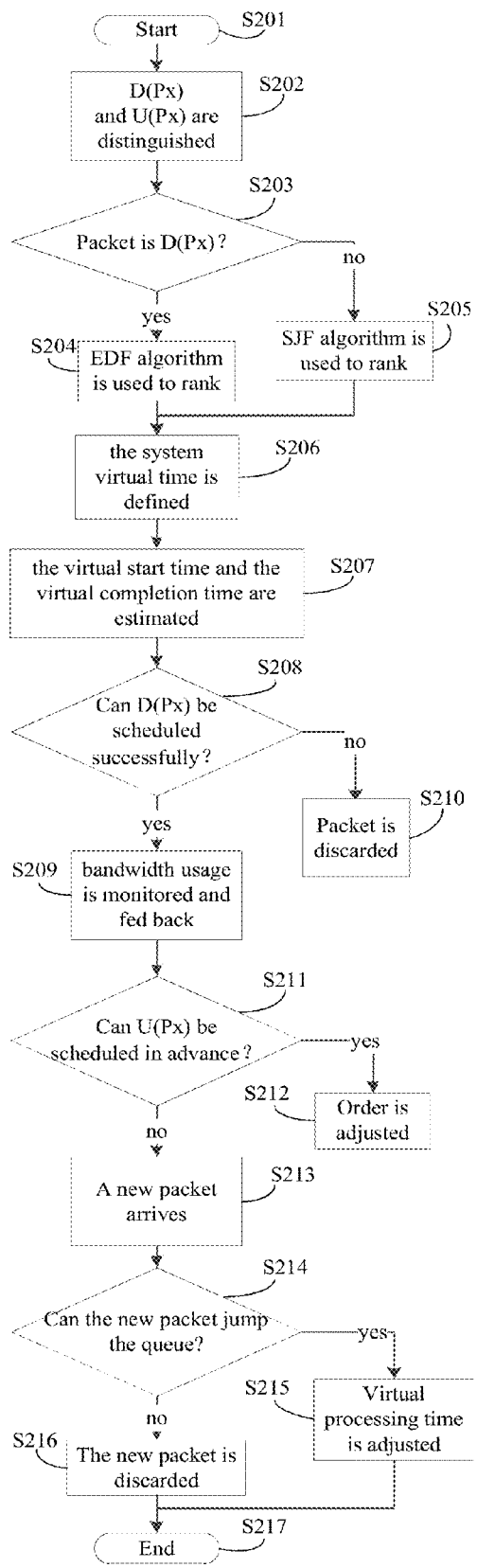
FIG. 2 is a flow chart of a multi-resource task scheduling method, according to another embodiment of the present disclosure.

As a specific embodiment, the multi-resource task scheduling method is further described together with FIG. 2. As shown in FIG. 2, the multi-resource task scheduling method according to another embodiment of the present embodiment includes following steps.

Step S201, start.

Step S202, $D(p_x)$ and $U(p_x)$ are distinguished. In other word, the concurrency packets are classified to distinguish packets $D(p_x)$ with deadline and packets $U(p_x)$ without deadline.

Step S203, whether the current packet is the packet $D(p_x)$ with deadline is determined, if yes, step S204 is executed, if no, step S205 is executed.

Step S204, EDF algorithm is used to rank the packets with deadline and step S206 is executed.

Step S205, i.e., the current packet is the packet $U(p_x)$ without deadline, SJF algorithm is used to rank the packets without deadline and the step S206 is executed.

Step S206, the system virtual time is defined. In other word, the system virtual time is initialized to zero. First, a virtual unit of time is defined. The virtual unit of time indicates that when weight of the packet is equal to 1, its processing time is 1 microsecond.

Step S207, the virtual start time and the virtual completion time are estimated. Specifically, the virtual start time and the virtual completion time of the i-th packet spending on resource j are:

$$S(p_i)=F(p_{i-1}),$$

$$F(p_i)=S(p_i)+s_i^j,$$

where $S(p_i)$ is the virtual start time of a packet Pi, $F(p_i)$ is the virtual completion time of the packet Pi, and $s_i^j$ is a virtual processing time of the packet Pi spending on resource j.

Step S208, whether the packet $D(p_x)$ with deadline is scheduled successfully is determined, if yes, step S209 is executed, if no, step S210 is executed.

Step S209, bandwidth usage of current packets is monitored and monitoring results are fed back and step S211 is executed.

Step S210, when the packet $D(p_x)$ with deadline cannot be scheduled successfully, the packet is discarded.

Step S211, whether there is a packet without deadline, which can be scheduled in advance to shorten the whole average completion time, existing in the packets without deadline is determined. If yes, step S212 is executed. If no, step S213 is executed;

Step S212, the packet without deadline, which can be scheduled in advance to shorten the whole average completion time, is scheduled before the packets with deadline.

Step S213, a new packet arrives.

Step S214, whether the new packet can jump the queue is determined, if yes, step S215 is executed, if no, step S216 is executed. In other word, first, whether the new packet is a packet with deadline is determined. If yes, whether the new packet influences other packets with deadline is determined. If the new packet does not influence other packets with deadline, the new packet is inserted before the current queue. If the new packet influences other packets with deadline, the new packet cannot jump the queue. Besides, when the new packet is a packet without deadline, the new packet is arranged in the queue tail according to the order of first-come-first-serve.

Step S215, when the new packet cannot jump the queue, the virtual processing time is adjusted and step S217 is executed.

Step S216, when the new packet can jump the queue, the new packet is inserted before the current queue and step S217 is executed.

Step S217, end.

The concurrency packets are classified to packets with deadline and packets without deadline according to the multi-resource task scheduling method of embodiments of the present disclosure. The packets with deadline are ranked using the EDF algorithm to reduce packet loss rate. The packets without deadline are ranked using the SJF algorithm to shorten the average completion time. Whether the scheduling is successful is determined by defining the system virtual time and calculating the estimated start time and completion time. The packets, which are not scheduled successfully, are discarded and the packets, which are scheduled successfully, are re-ranked to shorten the average completion time. Therefore, in the case of each packet requiring different resources, the method can shorten the average completion time of all tasks greatly by incorporating the EDF and SJF algorithms under the premise of minimizing packet loss rate. Therefore, better service can be provided for various network operations.

It is understood that, parts or part of the present disclosure can achieved by hardware, software or combinations thereof In the above embodiments, multiple steps or methods can be implemented by software or firmware stored in a storage unit and executed by a proper instruction execution system. For example, if the steps or methods are implemented by hardware, any of the following technologies and combination thereof in the art can be used to implement: discrete logic circuits having logic gate circuits configured to enable logic function of data signals, ASIC having a suitable combination of logic gate circuit, programmable gate array (PGA), and a field programmable gate array (FPGA), etc.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A multi-resource task scheduling method, comprising following steps:
    classifying a plurality of concurrency packets to distinguish packets with deadline and packets without deadline;
    ranking the packets with deadline using EDF algorithm and ranking the packets without deadline using SJF algorithm;
    estimating a virtual start time and a virtual completion time according to ranking results, wherein estimating the virtual start time and the virtual completion time according to the ranking results is implemented by the following equations:

$S(p_i)=F(p_{i-1})$, $F(p_i)=S(p_i)+s_i^j$, where $S(p_i)$ is the virtual start time of a packet Pi, $F(p_i)$ is the virtual completion time of the packet Pi, $s_i^j$ is a virtual processing time of the packet Pi spending on a resource j, and i indicates the i-th packet;
    determining whether the packets with deadline can be scheduled successfully according to the virtual start time and the virtual completion time;
    if the packets with deadline can be scheduled successfully according to the virtual start time and the virtual completion time, determining whether there is a packet without deadline, which can be arranged to be scheduled before the packets with deadline and can shorten average completion time, existing in the packets without deadline, according to the virtual start time and the virtual completion time; and
    if there is a packet without deadline, which can be arranged to be scheduled before the packets with deadline and can shorten average completion time, existing in the packets without deadline, according to the virtual start time and the virtual completion time, scheduling the packet without deadline, which can be arranged to be scheduled before the packets with deadline and can shorten the average completion time, in advance to shorten the average scheduling time of the plurality of packets.

2. The method of claim 1, wherein determining whether the packets with deadline can be scheduled successfully according to the virtual start time and the virtual completion time further comprises:
    discarding the packets with deadline if the packets with deadline cannot be scheduled successfully.

3. The method of claim 1, wherein discarding the packets with deadline if the packets with deadline cannot be scheduled successfully, comprises:
    determining whether there is a packet with a deadline smaller than $F(p_i)$ existing in the packets with deadline;
    if there is a packet with a deadline smaller than $F(p_i)$ existing in the packets with deadline, determining that the packet cannot be scheduled successfully and discarding the packet.

4. The method of claim 1, wherein scheduling the packet without deadline, which can be arranged to be scheduled before the packets with deadline and can shorten the average completion time, in advance , further comprises:
    setting number of the packet with deadline as m, and number of the packet without deadline as n;
    determining whether both of m and n satisfy the following formulas under any resource j:

$S(p_y)-S(p_x)-(s_y^j)\times(y-x)>0$, $\exists x \in (1,m), y \in (m+1, m+n), \forall j$ where, $p_x$ indicates the x-th packet with deadline, $p_y$ indicates the y-th packet, i.e., the (y−m)−th packet without deadline, $S(p_y)-S(p_x)$ indicates a time saved by scheduling $p_y$ before $p_x$, $(s_y^j)$ indicates a processing time of $p_y$ spending on the resource j, (y−x) indicates that number of packet that is influenced by scheduling $p_y$ in advance, and $(s_y^j)\times(y-x)$ indicates a total delay which is caused by scheduling $p_y$ before $p_x$ to other packets; and
    if both of m and n satisfy the formulas under any resource j, scheduling the packet without deadline in advance before the packet with deadline.

5. A multi-resource task scheduling method, comprising following steps:
    classifying a plurality of concurrency packets to distinguish packets with deadline and packets without deadline;
    ranking the packets with deadline using EFF algorithm and ranking the packets without deadline using SJF algorithm;
    estimating a virtual start time and a virtual completion time according to ranking results;
    determining whether the packets with deadline can be scheduled successfully according to the virtual start time and the virtual completion time;
    if the packets with deadline can be scheduled successfully according to the virtual start time and the virtual completion time, determining whether there is a packet without deadline, which can be arranged to be scheduled before the packets with deadline and can shorten average completion time, existing in the packets without deadline, according to the virtual start time and the virtual completion time; and if there is a packet without deadline, which can be arranged to be scheduled before the packets with deadline and can shorten average completion time, existing in the packets without deadline, according to the virtual start time and the virtual completion time, scheduling the packet without deadline, which can be arranged to be scheduled before the packets with deadline and can shorten the average completion time, in advance to shorten the average scheduling time of the plurality of packets;

determining whether a newly-arriving packet has a deadline;

if the newly-arriving packet has the deadline, determining whether the newly-arriving packet influences other packets with deadline;

discarding the newly-arriving packet if the newly-arriving packet influences other packets with deadline.

6. The method of claim 5, further comprising:

arranging the newly-arriving packet in the queue tail according to the order of first-come-first-serve if the newly-arriving packet has no deadline.

7. The method of claim 5, further comprising:

determining whether all tasks of the newly-arriving packet in a pre-set time period satisfy the following formulas simultaneously:

$$D(p_x) - F(p_x) \geq s_{new}^j,$$

$$\forall x \in (D(p_{new}) - s_{new}^j, F(p_m)), \forall j,$$

where, $p_{new}$ indicates the newly-arriving packet, $D(p_{new})$ indicates the deadline of $p_{new}$, $(D(p_{new}) - s_{new}^j, F(p_m))$ indicates the pre-set time period, and $s_{new}^j$ indicates the processing time of the newly-arriving packet spending on the resource j;

if all tasks of the newly-arriving packet in the pre-set time period satisfy the formulas simultaneously, inserting the newly-arriving packet before the other packets with deadline to be scheduled in advance.

8. The method of claim 7, further comprising:

discarding the newly-arriving packet if the newly-arriving packet does not satisfy the formulas simultaneously.

* * * * *